(12) United States Patent
Dods

(10) Patent No.: US 10,065,241 B2
(45) Date of Patent: Sep. 4, 2018

(54) COMBINED ADDITIVE MANUFACTURING AND MACHINING SYSTEM

(71) Applicant: General Electric Company, Schenectady, NY (US)

(72) Inventor: Bryan Galbraith Dods, Greer, SC (US)

(73) Assignee: General Electric Company, Schenectady, NY (US)

( * ) Notice: Subject to any disclaimer, the term of this patent is extended or adjusted under 35 U.S.C. 154(b) by 380 days.

(21) Appl. No.: 14/943,067

(22) Filed: Nov. 17, 2015

(65) Prior Publication Data

US 2017/0136540 A1    May 18, 2017

(51) Int. Cl.
| | |
|---|---|
| *B22F 3/04* | (2006.01) |
| *B22F 3/105* | (2006.01) |
| *B22F 3/115* | (2006.01) |
| *C23C 24/04* | (2006.01) |
| *B33Y 10/00* | (2015.01) |
| *B33Y 30/00* | (2015.01) |
| *B22F 3/24* | (2006.01) |
| *B23P 23/04* | (2006.01) |
| *B23P 25/00* | (2006.01) |
| *B23Q 11/10* | (2006.01) |
| *B33Y 40/00* | (2015.01) |
| *B23K 26/342* | (2014.01) |
| *B29C 64/20* | (2017.01) |

(52) U.S. Cl.
CPC ............ *B22F 3/1055* (2013.01); *B22F 3/04* (2013.01); *B22F 3/115* (2013.01); *B22F 3/24* (2013.01); *B23K 26/342* (2015.10); *B23P 23/04* (2013.01); *B23P 25/003* (2013.01); *B23Q 11/1053* (2013.01); *B29C 64/20* (2017.08); *B33Y 10/00* (2014.12); *B33Y 30/00* (2014.12); *B33Y 40/00* (2014.12); *C23C 24/04* (2013.01); *B22F 2003/1056* (2013.01); *B22F 2003/247* (2013.01); *B22F 2201/11* (2013.01); *B22F 2201/12* (2013.01); *B22F 2998/10* (2013.01)

(58) Field of Classification Search
CPC ............. B22F 3/04; B22F 3/115; C23C 24/04
USPC .......................................................... 419/66
See application file for complete search history.

(56) References Cited

U.S. PATENT DOCUMENTS

| | | |
|---|---|---|
| 3,971,114 A | 7/1976 | Dudley |
| 5,030,863 A | 7/1991 | Yoshimura et al. |
| 5,901,623 A | 5/1999 | Hong |

(Continued)

FOREIGN PATENT DOCUMENTS

| | | |
|---|---|---|
| CN | 204524789 U | 8/2015 |
| DE | 19533960 A1 | 3/1997 |

(Continued)

OTHER PUBLICATIONS

European Search Report for EP application No. 16199124.5, dated Mar. 16, 2017.

*Primary Examiner* — Mark A Chapman
(74) *Attorney, Agent, or Firm* — Eversheds Sutherland (US) LLP

(57) ABSTRACT

The present application provides a combined additive manufacturing and machining system. The combined additive manufacturing and machining system may include an outer chamber, an additive manufacturing tool positioned within the outer chamber, a machining tool positioned within the outer chamber, and a cryogenic fluid source in communication with the machining tool.

19 Claims, 2 Drawing Sheets

(56) References Cited

U.S. PATENT DOCUMENTS

| | | |
|---|---|---|
| 7,637,187 B2 | 12/2009 | Zurecki et al. |
| 8,303,220 B2 | 11/2012 | Rozzi et al. |
| 8,920,080 B2 | 12/2014 | Yamazaki et al. |
| 9,110,458 B2 | 8/2015 | Kimura et al. |
| 2003/0110781 A1 | 6/2003 | Zurecki et al. |
| 2006/0123801 A1* | 6/2006 | Jackson .................. B23B 27/10 62/52.1 |
| 2010/0305742 A1* | 12/2010 | Twelves, Jr. .......... B23P 21/004 700/112 |
| 2012/0092105 A1 | 4/2012 | Weinberg et al. |
| 2012/0146435 A1 | 6/2012 | Bott et al. |
| 2014/0100115 A1 | 4/2014 | Kummeth et al. |
| 2015/0000108 A1 | 1/2015 | Hascoet et al. |
| 2015/0298211 A1 | 10/2015 | Abe et al. |

FOREIGN PATENT DOCUMENTS

| | | | |
|---|---|---|---|
| WO | 2015/189600 | A2 | 12/2015 |
| WO | 2015/189600 | A3 | 12/2015 |

\* cited by examiner

COMBINED ADDITIVE MANUFACTURING AND MACHINING SYSTEM

TECHNICAL FIELD

The present application and the resultant patent relate generally to manufacturing systems and methods and more particularly relate to a combined additive manufacturing and machining system for high quality superalloy components and the like.

BACKGROUND OF THE INVENTION

Components used in, for example, the hot gas path of the combustion system of a gas turbine engine and the like may be made from a superalloy material with high temperature resistance and high corrosion resistance. Examples include nickel based alloys such as Inconel and other materials such as titanium. These components may be cast and then finished via machining. Due to the nature of the material, however, the machining tools generally need to be cooled while in operation. In fact, coolants and lubricants generally may be required to protect the machining tools.

Additive manufacturing systems may now accommodate different types of superalloys. Additive manufacturing systems may create highly complex three dimensional components with little waste. Additive manufacturing systems generally require very clean surfaces so as to avoid defects such as porosity and the like. Machining tools, however, generally require coolants and lubricants and may create dust and debris when in use. Given such, additive manufacturing systems and machining tools, particularly conventionally cooled tools, typically may be kept separated.

SUMMARY OF THE INVENTION

The present application and the resultant patent thus provide a combined additive manufacturing and machining system. The combined additive manufacturing and machining system may include an outer chamber, an additive manufacturing tool positioned within the outer chamber, a machining tool positioned within the outer chamber, and a cryogenic fluid source with a cryogenic fluid in communication with the machining tool.

The present application and resultant patent further provide a method of manufacturing and finishing a component. The method may include the steps of layering a superalloy within a chamber, fusing the superalloy with an energy source to create the component, and machining the component with a cryogenically cooled machine tool within the chamber.

The present application and the resultant patent further provide a combined additive manufacturing and machining system for creating and finishing a component. The combined additive manufacturing and machining system may include an outer chamber, an additive manufacturing tool positioned within the outer chamber, a machining tool positioned within the outer chamber, a cryogenic fluid source in communication with the machining tool, one or more tool shuttles for positioning the additive manufacturing tool and/or the machining tool, and a work table for supporting the component.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
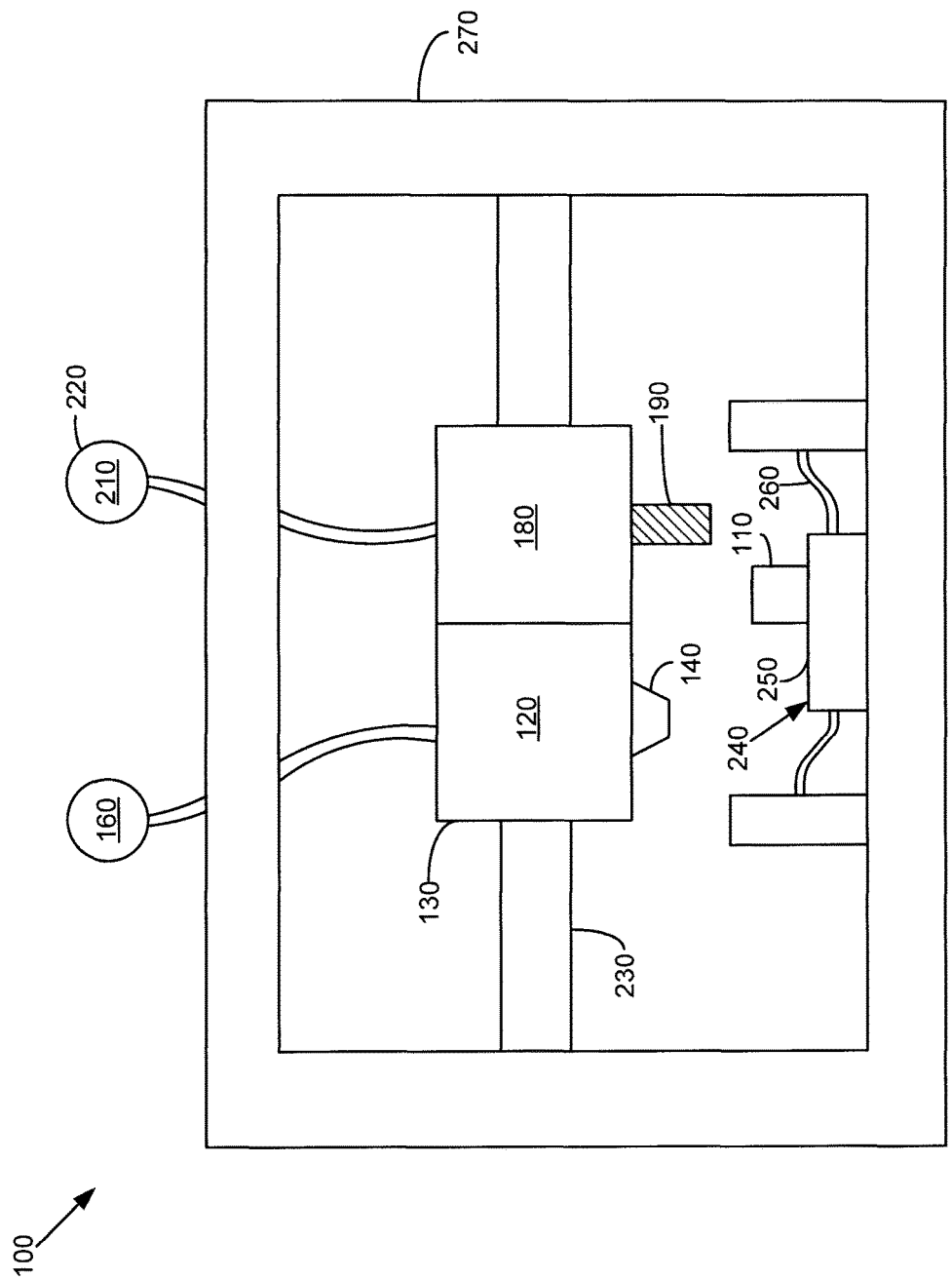
FIG. 1 is a schematic diagram of a combined additive manufacturing and machining system as may be described herein.

Referring now to the drawings, in which like numerals refer to like elements throughout the several views, FIG. 1 shows an example of combined additive manufacturing and machining system 100 as may be described herein. The additive manufacturing and machining system 100 may be used to manufacture a component 110. The component 110 may be made from a superalloy or any suitable material. The component 110 may be a turbine component or any type of high strength or high temperature component and the like. The component 110 may have any suitable size, shape, or configuration.

Figure 2:
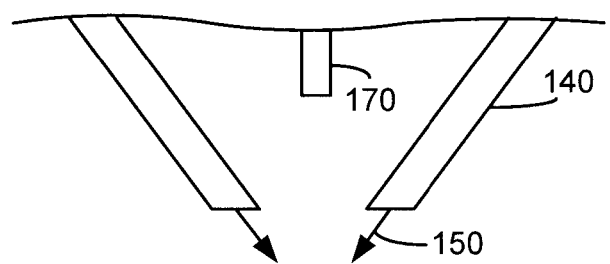
FIG. 2 is a schematic diagram of an exemplary nozzle of the additive manufacturing tool of the combined additive manufacturing and machining system of FIG. 1.
Figure 3:
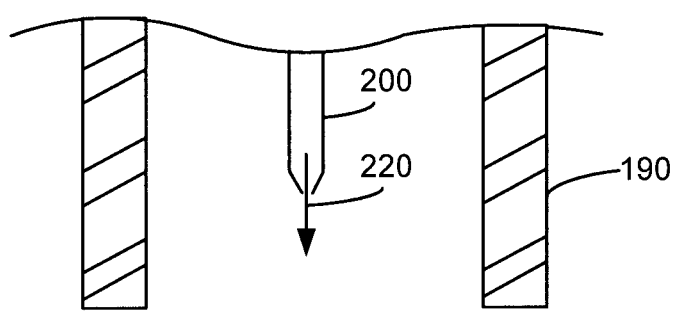
FIG. 3 is a schematic diagram of an exemplary machining tool of the combined additive manufacturing and machining system FIG. 1.

The combined additive manufacturing and machining system 100 may include an additive manufacturing tool 120. In this example, the additive manufacturing tool 120 may be a laser deposition welding tool 130. Generally described, and as is shown in FIG. 2, the laser deposition welding tool 130 may include a nozzle 140 with a metal powder stream 150 flowing therethrough. The nozzle 140 may be in communication with a metal powder source 160. The metal powder source 160 may include any type of a metal powder including superalloys and the like. The laser deposition welding tool 130 also may use metal wire and the like. The laser deposition welding tool 130 also includes a laser 170 positioned about the nozzle 140. The laser 170 may be, for example, a diode laser and the like. Any type of suitable laser device or energy source may be used herein with any suitable size, shape, configuration, or capacity. The laser deposition welding tool 130 may create the component 110 by applying layers of the metal powder stream 150 and then fusing the layers with the laser 170. An inert shielding/carrier gas also may be used. Other types of additive manufacturing tools 120 and techniques may be used herein. Other components and other configurations may be used herein.

The combined additive manufacturing and machining system 100 also may include a machining tool 180. The machining tool 180 may include a tool head 190. The tool head 190 may be of conventional design and may have any suitable size, shape, configuration, or capacity. The tool head 190 may be hollow and may include a cooling nozzle 200 therein. The cooling nozzle 200 may be in communication with a cooling fluid source 210. The cooling fluid source 210 may include a cryogenic fluid 220 or other type of cooling fluid. The cryogenic fluid 220 may be an inert gas and the like. Suitable inert gases may include helium, argon, and the like. Other types of cooling fluids may include nitrogen, carbon dioxide, and the like. The cryogenic fluid 220 may cool the tool head 190 while the tool head 190 is machining the component 110. Other components and other configurations may be used herein.

The combined additive manufacturing and machining system 110 may include one or more tool shuttles 230. The tool shuttles 230 may allow the additive manufacturing tool 120 and the machining tool 180 to maneuver in any desired direction. The additive manufacturing tool 120 and the machining tool 180 may share a tool shuttle 230 or each tool may have its own shuttle 230. The additive manufacturing tool 120 and the machining tool 180 may be interchanged via the tool shuttles 230. Although the additive manufacturing tool 120 and the machining tool 180 are shown as being positioned adjacent to each other, the additive manufacturing tool 120 and the machining tool 180 may be separate structures and may move together or separately. The tool shuttles 230 may be an X-Y movement device with two axes of movement or more. The tool shuttles 230 may be of conventional design and may have any suitable size, shape, or configuration. Other components and other configurations may be used herein.

The combined additive manufacturing and machining system 100 also may include a work table 240. The work table 240 may support the component 110 thereon during manufacture and machining. In this example, the work table 240 may be a rotary table 250. The rotary table 250 may allow the component 110 to rotate. The work table 240 also may include a swivel assembly 260. The swivel assembly 260 may allow the positioning of the component 110 as desired in two, three, four, or five axes of movement. The work table 240 may be of conventional design and may have any suitable size, shape, or configuration. Other components and other configurations may be used herein.

The combined additive manufacturing and machining system 100 may include an outer chamber 270 enclosing the additive manufacturing tool 120 and the machining tool 180 in whole or in part. The outer chamber 270 may have any suitable size, shape, or configuration. The outer chamber 270 may be largely air tight to maintain the cryogenic fluids 230, other types of cooling fluids, and the inert gases therein. Positive pressure may be created by evaporating gas from the cryogenic. The interior of the outer chamber 270 may be accessed in any convenient fashion. The interior of the outer chamber 270 also may be heated or cooled. Other components and other configurations may be used herein.

In use, the combined additive manufacturing and machining system 100 may create the component 110 via the additive manufacturing tool 120. Specifically, the laser deposition welding tool 130 builds layer upon layer of the metal powder stream 150 and then fuses the layers via the laser 170. Once the component 110 is completed and has cooled, the machining tool 180 may finish the component 110 as desired. Alternatively, the additive manufacturing tool 120 and the machining tool 180 may be interchanged several times so as to create complex internal structures, passages, and the like. The tool shuttles 230 and the work table 240 allow the component 110 and/or the tools to be precisely positioned throughout the entire process. The use of the cryogenic fluid 220 or other type of cooling fluid permits the accurate machining of superalloys and the like. Specifically, the cryogenic fluid 220 provides the proper level of coolant/lubricant for the tool head 190. Upon evaporation, the cryogenic fluid 220 may provide an inert atmosphere for the additive manufacturing tool 120 and the additive processes. Other components and other configurations may be used herein.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

I claim:

1. A combined additive manufacturing and machining system, comprising:
    an outer chamber;
    an additive manufacturing tool positioned within the outer chamber;
    a machining tool positioned within the outer chamber; and
    a cryogenic fluid source in communication with the machining tool, wherein the cryogenic fluid source comprises an inert fluid configured to evaporate after a machining process to provide an inert atmosphere for the additive manufacturing tool for an additive process.

2. The combined additive manufacturing and machining system of claim 1, wherein the additive manufacturing tool comprises a laser deposition welding tool.

3. The combined additive manufacturing and machining system of claim 1, wherein the additive manufacturing tool comprises a laser.

4. The combined additive manufacturing and machining system of claim 1, wherein the additive manufacturing tool comprises a nozzle in communication with a metal source.

5. The combined additive manufacturing and machining system of claim 4, wherein the metal source comprises a metal powder stream or a metal wire.

6. The combined additive manufacturing and machining system of claim 4, wherein the metal source comprises a superalloy.

7. The combined additive manufacturing and machining system of claim 1, wherein the machining tool comprises a tool head.

8. The combined additive manufacturing and machining system of claim 7, wherein the tool head comprises a cooling nozzle in communication with the cryogenic fluid source.

9. The combined additive manufacturing and machining system of claim 1, wherein the inert fluid comprises helium or argon.

10. The combined additive manufacturing and machining system of claim 1, wherein the cryogenic fluid source comprises nitrogen or carbon dioxide.

11. The combined additive manufacturing and machining system of claim 1, further comprising one or more tool shuttles for positioning the additive manufacturing tool and/or the machining tool.

12. The combined additive manufacturing and machining system of claim 1, further comprising a work table.

13. The combined additive manufacturing and machining system of claim 12, wherein the work table comprises a rotary table and/or a swivel assembly.

14. A method of manufacturing and finishing a component, comprising:
    layering a superalloy within a chamber;
    fusing the superalloy with an energy source to create the component;
    machining the component with a cryogenically cooled machine tool within the chamber; and
    evaporating an inert fluid of the cryogenically cooled machine tool within the chamber after machining the component to provide an inert atmosphere for an additive process.

15. A combined additive manufacturing and machining system for creating and finishing a component, comprising:
    an outer chamber;
    an additive manufacturing tool positioned within the outer chamber;

a machining tool positioned within the outer chamber;
a cryogenic fluid source in communication with the machining tool, wherein the cryogenic fluid source comprises an inert fluid configured to evaporate after a machining process to provide an inert atmosphere for the additive manufacturing tool for an additive process;
one or more tool shuttles for positioning the additive manufacturing tool and/or the machining tool; and
a work table for supporting the component.

16. The combined additive manufacturing and machining system of claim 15, wherein the additive manufacturing tool comprises a laser deposition welding tool.

17. The combined additive manufacturing and machining system of claim 15, wherein the additive manufacturing tool comprises a laser and a nozzle in communication with a metal source.

18. The combined additive manufacturing and machining system of claim 15, wherein the machining tool comprises a tool head and a cooling nozzle in communication with the cryogenic fluid source.

19. The combined additive manufacturing and machining system of claim 15, wherein the cryogenic fluid source comprises helium, argon, nitrogen, or carbon dioxide.

* * * * *